United States Patent Office 3,393,170
Patented July 16, 1968

3,393,170
DISCOLORATION INHIBITED AMIDE SOLUTIONS OF VINYLIDENE HALIDE POLYMERS
Francis Frederick Koblitz, Erdenheim, and Robert Gabriel Petrella, Philadelphia, Pa., assignors to Pennsalt Chemicals Corporation, Philadelphia, Pa., a corporation of Pennsylvania
No Drawing. Filed Apr. 28, 1966, Ser. No. 545,884
17 Claims. (Cl. 260—30.2)

ABSTRACT OF THE DISCLOSURE

A solution of vinylidene fluoride polymer in amide-type solvent is stabilized against the degradating and discoloring effects of heat and light by incorporating therein a minor amount of an acyl chloride, acid anhydride, or mixture thereof.

---

This invention is directed to solutions of polymers and copolymers of vinylidene fluoride stabilized against deterioration by heat and light.

Vinylidene fluoride polymers can be solvated with certain organic solvents at elevated temperatures to form solutions which are stable at ambient temperatures, as taught in U.S. Patent 3,211,687 granted Oct. 12, 1965. From such solutions, fairly thick films and coatings can be obtained.

In preparing solutions of the type disclosed in the above patent, it was found that when some commercial amide-type solvents were used and these solutions were stored in presence of heat and light, or were heated substantially above room temperature, either in the presence or absence of light, the solutions became yellow to brown on standing. Also, it was found that some commercially available amide-type solvents used in preparation of the vinylidene fluoride polymer solutions undergo the same deterioration in the presence of heat and light even in the absence of the vinylidene fluoride polymer.

More particularly, we have discovered that a compound from the group consisting of acid anhydrides and acyl chlorides, used either alone or in combination with each other in a minor amount relative to the amount of solvent treated is particularly effective for stabilizing amide-type solvents having a tendency to discolor both before and after dissolving vinylidene fluoride polymer in such a solvent., We have found these compounds (hereinafter referred to as discoloration inhibitors, or stabilizers) to be particularly effective when used in combination. The acid anhydrides and acyl chlorides preferably used have the desirable property of being more volatile than the amide-type solvents in which they are used in the practice of the invention. This property is especially advantageous in the presence of the vinylidene fluoride polymer used to form films because no residues or side effects result from including either or both groups of the stabilizers in the solvent.

The acyl chlorides, e.g. acetyl chloride, are particularly reactive and volatile and are able to combine with traces of water and free amines initially present in the amide-type solvents. The acid anhydrides, e.g. acetic anhydride, are less reactive and less volatile than are the acyl chlorides but likewise are able to combine with water and free amines during storage of the solvents.

It has been found that the amount of discoloration inhibitor, in the form of acid anhydride or acyl chloride, or a combination thereof, required to stabilize color of an amide-type solvent requiring stabilization varies depending on the particular amide-type solvent being stabilized. We have found that as little as 0.1% of acetyl chloride is effective in inhibiting color formation in potentially discolorable dimethylacetamide for a period of several months in outdoor sunlight storage tests at temperatures of 40°–80° C. On the other hand, even 1% by weight of solvent of a 1:1 mixture of acetic anhydride and acetyl chloride is not sufficient adequately to stabilize against unstable discoloration in potentially discolorable N-methyl-2-pyrrolidone under like conditions. While an unnecessary excess of stabilizer should be avoided, sufficient stabilizer should be used to obtain the desired stabilizing effect for the normal shelf life period of the solution under expected ambient heat and light conditions. Normal shelf-life may be from as little as an hour to many months. Therefore, the amount of stabilizer used for each amide-type solvent needs to be determined experimentally for the particular solvent. This can be done readily by methods well known to those skilled in the art. However, in general, we have found that stabilizer hereof, either alone or in the presence of vinylidene fluoride polymer, will stabilize the potentially discolorable amide-type solvent for prolonged periods of time when stabilizer, either as acid anhydride or acyl chloride, or a combination thereof, is present in the solvent in an amount of from about 0.1 to 10% by weight of the amide-type solvent.

Although our invention is directed primarily to amide solutions of vinylidene fluoride homopolymer, it is also directed to amide solutions of vinylidene fluoride copolymers which contain in the polymer molecule more than 50% vinylidene fluoride radicals and less than 50% by weight of polymer radicals derived from halogen-containing olefins having from 2 to 4 carbon atoms. Preferably, the vinylidene fluoride radicals are present in the copolymer in amounts not less than 95 mol percent of the copolymer. At this concentration, the important solution properties of copolymers of vinylidenes fluoride are nearly identical to those of the homopolymer.

Preferred haloethylene monomers which can be copolymerized with the vinylidene fluoride to make copolymers which can be used to make discoloration inhibited amide solutions of vinylidene fluoride polymer in accordance with our invention are vinyl chloride, vinyl fluoride, vinyl bromide, vinylidene chloride, difluorochloroethylene, trifluorochlorotrifluoroethylene and tetrafluoroethylene.

A preferred halopropylene monomer which can be copolymerized with vinylidene fluoride for the above same purpose is hexafluoropropylene.

Preferred halobutadiene monomers which can be copolymerized with vinylidene fluoride for the above same purpose are polyfluorinated butadienes, e.g., 1,1,2-trifluorobutadiene-1,3. Whenever the term vinylidene fluoride polymer or copolymer is used in this application, we are referring to the homopolymer or copolymers as defined above.

The amide-type solvents used in preparation of the compositions of the present invention preferably are those used in preparation of solutions of vinylidene fluoride homopolymer and copolymers as defined above. For preparing discoloration inhibited amide solutions of vinylidene fluoride homopolymer, it is preferred to use at least one solvent selected from the group consisting of N,N-dimethylacetamide, tetramethylurea and N,N-diethylacetamide, the homopolymer being present in such solutions within the range of about 5 to about 30 weight percent, based on the weight of solution, and the amount of stabilizer as acid anhydride or acyl chloride, or a combination thereof, being present in the amount from 0.1% to about 10% of weight of the solvent, about equal to from 0.07% to about 9.5% of the weight of the solution.

When the vinylidene fluoride polymer is a copolymer, other amide-type solvents in addition to those preferably used with a homopolymer can also satisfactorily be used for preparing discoloration inhibited solutions of the polymer, the above described three amide solvents still being preferred. Representative amide compounds which as solvents for a copolymer are advantageously used in the presence of our discoloration inhibitors to prepare a composition of this invention are the following:

N,N-dimethylacetamide, N,N-dimethylformamide, N,N - dimthyl - gamma - hydroxyacetamide, N,N - dimethyl-gamma - hydroxybutyramide, N,N - dimethyllactamide, N,N - dimethylmethoxyacetamide, N,N - dibutylformamide, N - methylpropionamide, 2 - piperidone, N -methyl - 2 - piperidone, N - methyl - 2 - pyrrolidone, N - ethyl-2 - pyrrolidone, N-isopropyl-2-pyrrolidone, and 5-methyl-2 - pyrrolidone. N,N - diethylformamide, tert-butylformamide, and N,N-dimethylacetoacetamide are useful as latent solvents.

The term amide-type solvent is intended to include amides, lactams and ureas (of which examples are given above) in accordance with the definition for these compounds given in "The Naming and Indexing of Chemical Compounds," The American Chemical Society (1962).

Commercially pure forms of the amide-type solvents are preferably used in order to keep the amount of stabilizer used to a desirable minimum.

Acyl chlorides which can be used in the practice of the invention include acetyl chloride (B.P. 52° C.), propionyl chloride (B.P. 80° C.), and butyryl chloride (B.P. 102° C.).

Acid anhydrides which can be used in the practice of the invention include acetic anhydride (B.P. 136.4° C.), butyric anhydride (B.P. 198° C.), and propanoic anhydride (B.P. 168.1° C.).

In practicing the invention, a discoloration inhibiting amount of acid anhydride or acyl chloride, or preferably a mixture of these two stabilizers i.e. discoloration inhibiting compounds, preferably is mixed into the amide-type solvent before the latter is mixed with the vinylidene fluoride polymer. The mixing is preferably done at room temperature, and, in any case, substantially below the boiling point of the stabilizer compound, i.e. below about 51–2° C. for acetyl chloride when used alone, and below about 140° C. for acetic anhydride when used alone. However, the amide-type solvent and vinylidene fluoride polymer also can be mixed together at room temperature and the stabilizer added to the mixture before heat is applied to dissolve the polymer. Heating of the mixture of the amide-type solvent and the polymer in the absence of the stabilizer has been found detrimental to the heat and light stability of the solution. This result apparently is due to interaction of the solvent and its minor impurities with the polymer and its minor impurities. Addition of the stabilizer before heating of the mixture is believed to prevent such interaction and thus avoids discoloration of the solution during the heating and cooling steps and for substantial periods of time thereafter.

Stabilized solutions of vinylidene fluoride polymer in the amide-type solvent can be prepared in the following way. The solvent, e.g. 100 parts by weight of N,N-dimethylformamide, is placed in a vessel equipped with an agitator, a discoloration inhibiting amount of a stabilizer, e.g. 5 parts of acetic anhydride (5% based on the weight of solvent) is added to the vessel and mixed well with the solvent. Twenty parts of finely-divided vinylidene fluoride polymer, e.g. powdered homopolymer of vinylidene fluoride, are then mixed into the stabilized solvent in the vessel. The temperature of the mass in the vessel is raised to about 60° C. or within the range of 50° to 90° C. Agitation is continued until complete solution occurs. The mixture is then allowed to cool to room temperature and is then ready for use. Other mixing apparatus may be used, such as paint mills and colloid mills. The particle size of the polymer is not of prime importance in preparing these solutions. However, if the polymer is in powder form, it will go into solution readily and in a short period of time.

In order to avoid a high solution viscosity, another organic liquid which is not a solvent for the vinylidene fluoride polymer but which will reduce the viscosity of the solution of the polymers in the solvent can be used as taught in U.S. 3,110,692. In general, any water-white organic liquid which is miscible with the solution of vinylidene fluoride polymer in the solvent is suitable. Examples of such organic liquids are acetone, dioxane, methylisobutylketone, tetrahydrofuran, methylethylketone, xylene, and methylamylketone. Generally, we prefer to use only one diluent. More than one can be used, if desired, as when the evaporation rate of the solvent mixture must be adjusted in coatings applications.

The amount of diluent to be added will be determined primarily by the viscosity required by the particular method of application of the solution. This will be a compromise between the desire to have the maximum solids content in the mixture in order to obtain maximum coating or film thickness with a low enough viscosity to have solutions which will flow. In general, the amount of diluent may vary from 5 to 50% of the total mixture weight. The amount of stabilizer used will, however, still be based on the amount of amide-type solvent used in the mixture of solvents.

The following specific examples of preferred embodiments further illustrate the principles and practice of the invention. Parts and percentages are by weight unless otherwise indicated.

EXAMPLE 1

A stock of stabilized (discoloration inhibited) dimethylacetamide (DMAC) was prepared by dissolving in a glass vessel 5 g. of acetyl chloride in 5000 g. of dimethylacetamide (technical grade) which tended to turn dark and yellow on standing. The solution was stirred and heated to 60° C. over a period of 30 minutes. Five g. of acetic anhydride then were stirred in. The vessel then was covered tightly and allowed to cool to room temperature. The stabilized solvent was bottled for storage until used.

EXAMPLE 2

400 g. of vinylidene fluoride homopolymer in powdered form were stirred into 1600 g. of the above stabilized DMAC of Example 1. The mixture was agitated in a heavy duty Waring blender until the polymer was completely "dissolved." The solution was filtered through 90 gauge cheesecloth (4 thicknesses) and then placed in a glass container having a vapor-tight cover.

A sample of the stabilized solution then was placed in a vapor-tight clear glass jar and placed on the roof of a building and exposed to sunlight at temperatures ranging from 40° F. to 80° F. After 2½ months' exposure, the solution in the container had a white solid cake at the top, but was water white and was not discolored or hazed. After 9 months' inside storage, the remaining solution still appeared unchanged in color. The initial viscosity of the initial stabilized solution was 6600 cps.; after 7 days, it was 6400 cps.; after 20 days it was 6800 cps. After 9 months the solution was still clear and fluid.

EXAMPLE 3

A control sample prepared as in Example 1, but without the addition of the acetyl chloride and acetic anhydride was similarly prepared for testing. The solution turned yellow upon mixing.

EXAMPLE 4

(a) 100 parts of vinylidene fluoride homopolymer, 20 parts of acetic anhydride and 400 parts of dimethylformamide (technical grade) which had no significant discoloration were mixed at room temperature in a heavy duty blender until a homogeneous solution resulted. The solution was filtered through a pad of eight layers of 60 gauge cheesecloth. A water-white clear solution was obtained.

(b) For comparison with the stabilized solution of (a), 100 parts of the same homopolymer were dissolved in 400 parts of more of the same stock of dimethylformamide as in (a). The resulting solution was light tan in color.

EXAMPLE 5

990 parts of dimethylacetamide similar to that used in Example 1 and 5 parts of acetyl chloride were mixed together and heated at 60° C. for 30 minutes. Five parts of acetic anhydride were then added. The resulting stabilized solution was placed in a heavy duty blender. Next, 500 parts of acetone and 500 parts of powdered vinylidene fluoride homopolymer were added, and the mass was stirred until a homogeneous solution was formed. The solution was water-white in color and clear. After one week standing in the laboratory, the viscosity of the solution was measured and was found to be 11,200 cp. After three weeks, the viscosity measured 15,540 cp., and the solution was slightly hazy.

The stabilized solution was placed in a clear glass storage test jar and placed on a roof test station. Temperature extremes were 40° F. to 85° F. The solution remained white and fluid for ten weeks.

EXAMPLE 6

From the solution of Example 5, films of the polymer were cast on a ferrotype plate to determine stability of the solution at higher temperatures. The cast film was baked at 100° C. in a circulating air oven for 10 minutes, then baked for 12 minutes while the temperature was raised to 205° C., and finally baked 10 minutes at 205° C. The resulting cast film showed no discoloration and had a tensile strength of 3700 p.s.i. with an elongation at break of 260%.

Many different embodiments of this invention may be made within the scope and spirit of it, and it is intended that all such embodiments besides those illustrated herein be included in the invention as claimed.

We claim:

1. A composition of matter comprising in admixture (a) polymer of vinylidene fluoride containing in the polymer molecule more than 50 percent by weight of vinylidene fluoride radicals, (b) sufficient amide-type solvent to substantially dissolve the polymer, said solvent selected from the group consisting of N,N-dimethylformamide, N,N-dimethylacetamide, N-methyl-2-pyrrolidone, N,N - diethylacetamide, N,N - diethylformamide, N,N-dimethyl-gamma-hydroxyacetamide, N,N-dimethyl-gamma - hydroxybutyramide, N,N - dimethyllacetamide, N,N-dimethylmethoxyacetamide, N,N-dibutylformamide, N-methylpropionamide, 2-piperidone, N-methyl-2-piperidone, N-methyl-2-pyrrolidone, N-ethyl-2-pyrrolidone, N-isopropyl - 2 - pyrrolidone, 5 - methyl - 2-pyrrolidone, and tetramethylurea, and (c) from about 0.1 to about 10% by weight of said solvent of discoloration inhibitor, said inhibitor being selected from the group consisting of acetyl chloride, propionyl chloride, butyryl chloride, acetic anhydride, propanoic anhydride, butyric anhydride, and mixtures thereof.

2. The composition according to claim 1 wherein the polymer is homopolymer of vinylidene fluoride.

3. The composition according to claim 1 wherein the polymer is copolymer of vinylidene fluoride with a halogenated olefin monomer selected from the group consisting of vinyl chloride, vinyl fluoride, vinyl bromide, vinylidene chloride, difluorochloroethylene, trifluorochloroethylene, tetrafluoroethylene, hexafluoropropene and 1,1,2-trifluorobutadiene-1,3.

4. The composition according to claim 1 wherein the amide solvent is N,N-dimethylformamide.

5. The composition according to claim 1 wherein the amide solvent is N,N-diethylacetamide.

6. The composition according to claim 1 wherein the amide solvent is tetramethylurea.

7. The composition according to claim 1 wherein the amide solvent is N-methyl-2-pyrrolidone.

8. The composition according to claim 1 wherein the discoloration inhibitor is acetic anhydride.

9. The composition according to claim 1 wherein the discoloration inhibitor is acetyl chloride.

10. The composition according to claim 1 wherein the discoloration inhibitor is a mixture of acetic anhydride and acetyl chloride.

11. The composition according to claim 1 wherein the amount of polymer in the solution is within the range from about 5 to about 30 weight percent based on the weight of solution and the amount of discoloration inhibitor is from 0.07% to about 9.5% of the weight of the solution.

12. The compositon according to claim 11 wherein the polymer is homopolymer of vinylidene fluoride.

13. The composition according to claim 3 wherein the vinylidene fluoride radicals are present in the copolymer in amounts not less than 95 mol percent of the copolymer.

14. Discoloration inhibited amide-type solvent comprising amide-type solvent selected from the group consisting of N,N - dimethylformamide, N,N - dimethylacetamide, N - methyl-2-pyrrolidone, N,N-diethylacetamide, N,N - diethylformamide, N,N-dimethyl-gamma-hydroxyacetamide, N,N - dimethyl - gamma - hydroxybutyramide, N,N - dimethyllacetamide, N,N - dimethylmethoxyacetamide, N,N-dibutylformamide, N-methylpropionamide, 2-piperidone, N - methyl-2-piperidone, N-methyl-2-pyrrolidone, N-ethyl-2-pyrrolidone, N - isopropyl-2-pyrrolidone, 5-methyl-2-pyrrolidone, and tetramethylurea, containing from about 0.1 to about 10% by weight of a discoloration inhibitor selected from the group consisting of acetyl chloride, propionyl chloride, butyryl chloride, acetic anhydride, propanoic anhydride, butyric anhydride, and mixtures thereof.

15. Discoloration inhibited amide-type solvent according to claim 14 in which the inhibitor is acetic anhydride.

16. Discoloration inhibited amide-type solvent according to claim 14 in which the inhibitor is acetyl chloride.

17. Discoloration inhibited amide-type solvent according to claim 14 in which the inhibitor is a mixture of acetic anhydride and acetyl chloride.

References Cited
UNITED STATES PATENTS

| | | | |
|---|---|---|---|
| 3,110,692 | 11/1963 | Proctor | 260—30.2 |
| 3,180,848 | 4/1965 | Thompson | 260—45.85 |
| 3,211,687 | 10/1965 | Capron et al. | 260—32.6 |

MORRIS LIEBMAN, *Primary Examiner.*

L. T. JACOBS, *Assistant Examiner.*